Sept. 29, 1970  W. R. HARVEY ET AL  3,531,257
METHOD AND APPARATUS FOR MEASURING VOLUME VARIATION IN
CHEMICAL, PHYSIOLOGICAL AND BIOCHEMICAL SYSTEMS
Filed Aug. 5, 1964  3 Sheets-Sheet 2
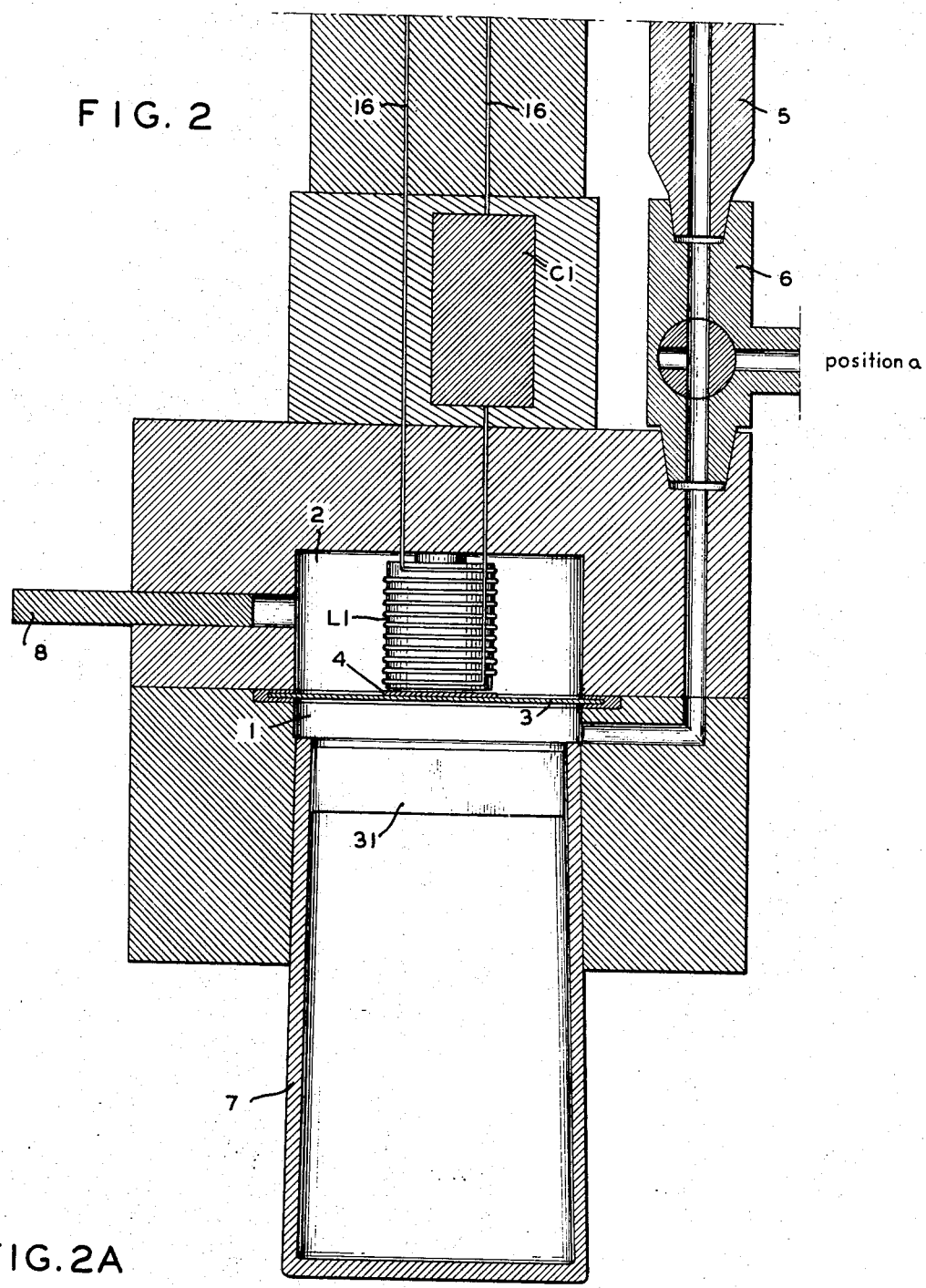
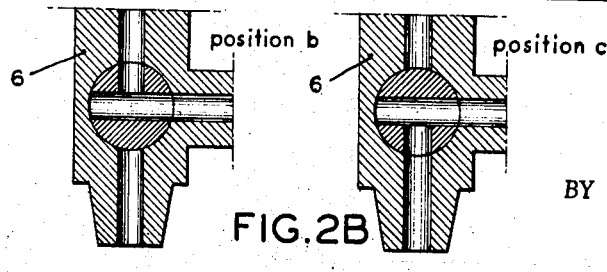
INVENTORS
WILLIAM R. HARVEY
DONALD F. KNOWLES
BY Sol Shappirio
ATTORNEY

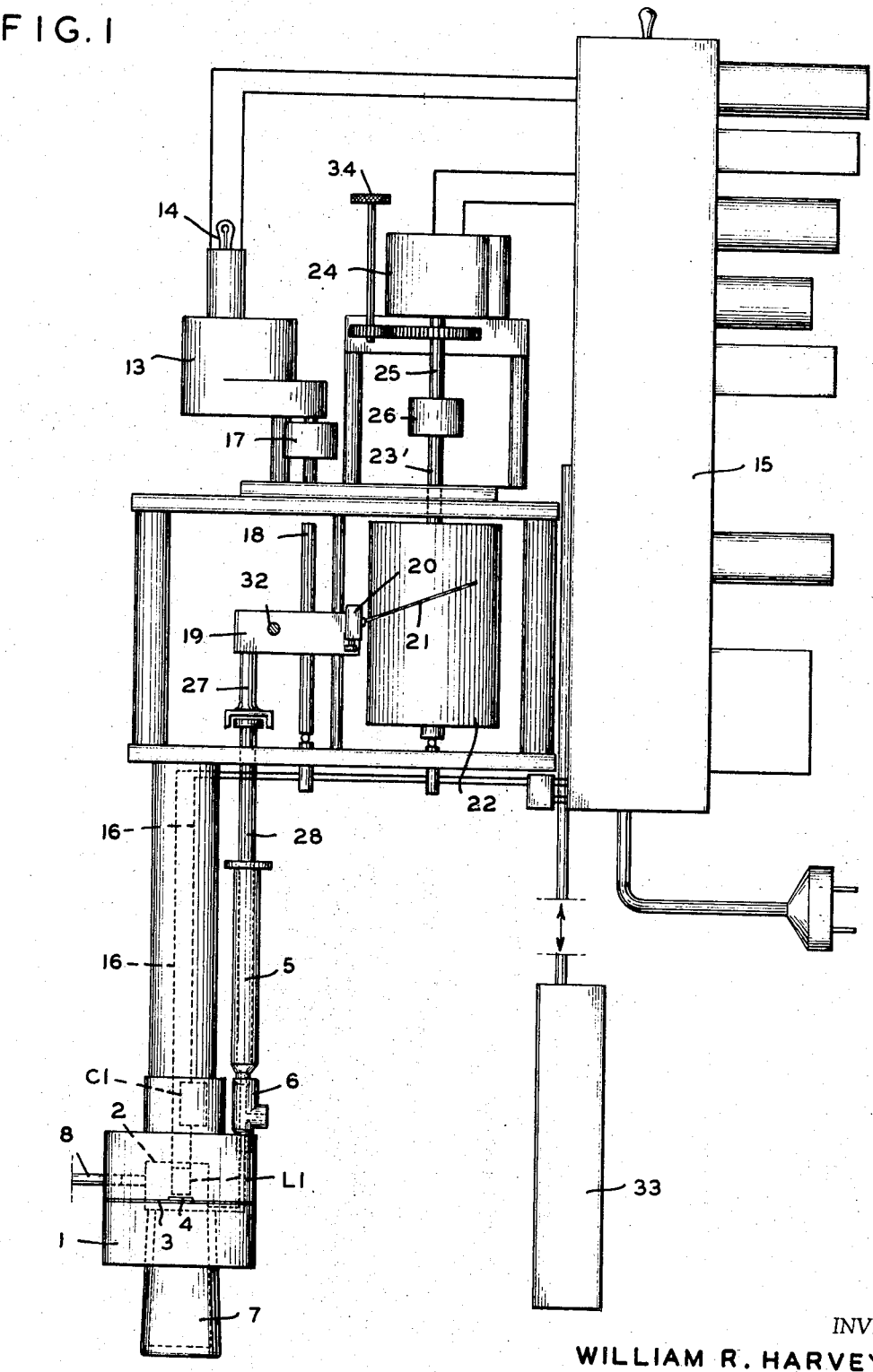

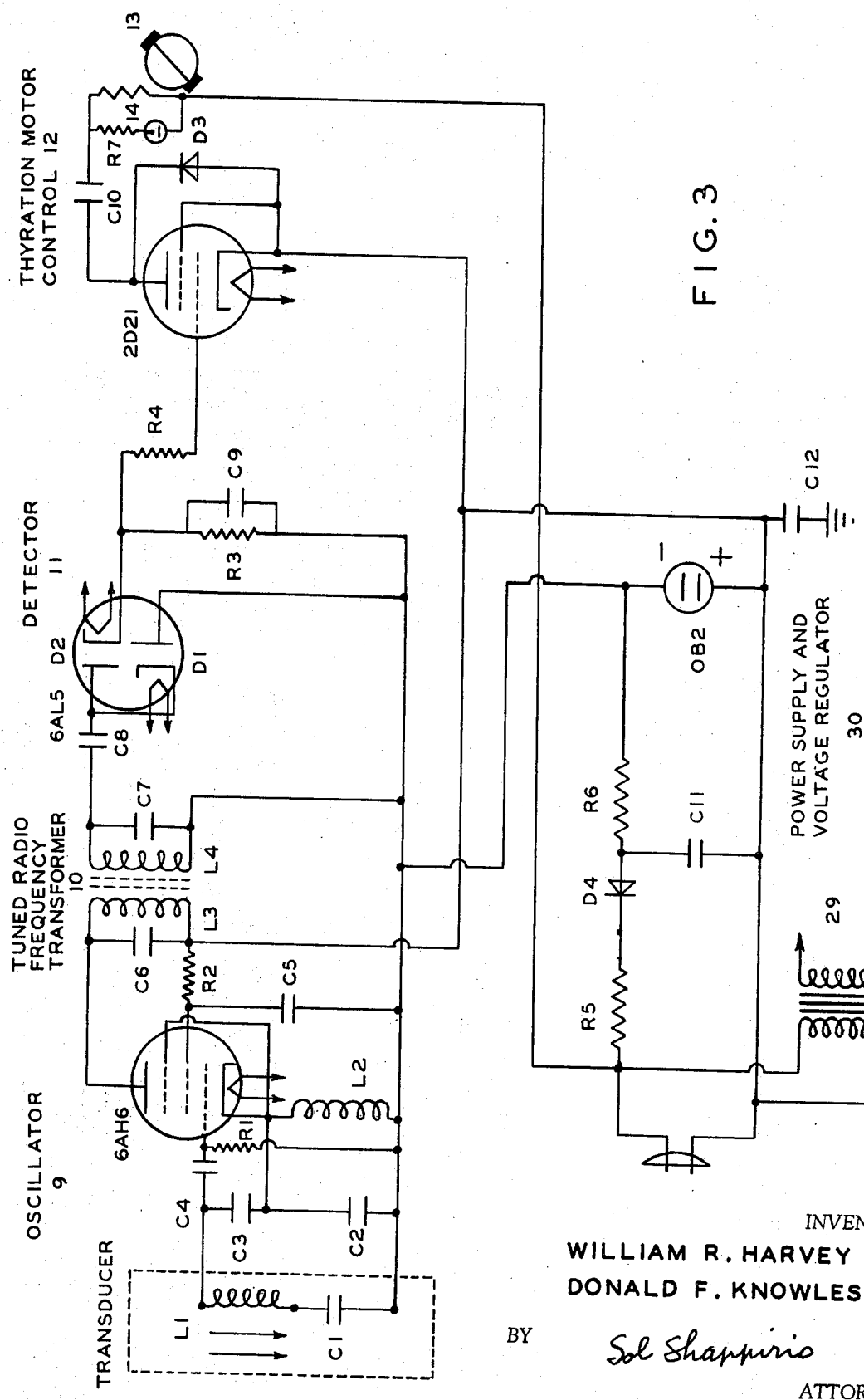

United States Patent Office 3,531,257
Patented Sept. 29, 1970

3,531,257
METHOD AND APPARATUS FOR MEASURING VOLUME VARIATION IN CHEMICAL, PHYSIOLOGICAL AND BIOCHEMICAL SYSTEMS
William R. Harvey, 73 Massasoit St., Northampton, Mass. 01060, and Donald F. Knowles, Ashford, Conn. (Box 208, R.F.D. 3, Stafford Springs, Conn. 06076)
Filed Aug. 5, 1964, Ser. No. 387,588
Int. Cl. G01l 9/10, 9/12; G01n 7/10
U.S. Cl. 23—232    7 Claims

ABSTRACT OF THE DISCLOSURE

Method and apparatus for continuously measuring consumption of gas particularly in chemical, physiological and biochemical activities which comprises a closed reaction chamber and a closed compensating chamber separated from the reaction chamber by a thin glass membrane having substantial elastic recoil properties and also having a ferrite component mounted thereupon. An electrical sensing device, having a fixed capacitance and inductor responsive to gas volume change in the reaction chamber, is provided together with a device for converting varying inductance into varying voltage. A system responsive to said varying voltage functions to restore gas volume and pressure in the reaction chamber to the initial value and means also is also provided for measuring the amount of gas change.

---

This invention relates to methods and apparatus for measuring and recording volume variation in chemical, particularly physiological and biochemical systems and wherein in such systems, the volume changes may be small so that highly sensitive and exact measurement are obtainable in simple and relatively inexpensive apparatus and methods. It utilizes a servo-mechanism for measuring and recording micro changes in volume particularly by a compensated pressure transducer coupled by an electronic relay circuit to an injector-recorder system and methods of carrying out said procedures.

Devices for detecting and recording uptake of gases, specifically, respirometers, are commercially available, but they are not satisfactory for a number of reasons. Principally, they lack sensitivity that would enable them to be used for highly sensitive recording of gas-volume changes of relatively small degree in physiological or biochemical systems, but also in chemical systems which are non-biological. Cartesian divers are extremely sensitive recording devices but have the limitation that they are cumbersome to build and require great technical skill to operate. Moreover, they operate below 0.1 μl. gas and are not useful in the range from about 0.000,000,1 to 1 liter covered by the present invention. In some of the devices heretofore proposed the animal or plant or tissue undergoing respiratory measurements dependent on gas-volume variation is maintained in a gas phase at atmospheric pressure. The position of the shutter controlling in such systems is thus at the mercy of atmospheric currents, a well-known problem in resiprometry. In these and others the respirometer is uncompensated and is thus susceptible to certain factors that influence both sensitivity and accuracy. Related to such factors as lack of compensation is that measurements can be made in such cases only where gas uptake is sufficiently large so that errors due to changing atmospheric pressure are disregarded. They obviously are not satisfactory even for small animals such as mice, and certainly incapable for use at the micro level encountered in insect or other respiration investigations.

In one such type of apparatus in the art a piston-like member or inverted cup moves an opaque screen or shutter to produce a change in the light reaching a photocell. Actually a change of volume of gas proportional to the movement of the screen half-way down the photocell must be made before the device responds. Further, such devices in the art require rather elaborate and complicated evaluation. For example the gas uptake is recorded as a straight line whose length is proportional to volume with elapsed time indicated by the distance between successive small vertical lines. To calculate the rate of gas uptake, the length of the line must be measured and divided by the distance between the successive vertical lines. For a plot of rate, this latter figure must be plotted against time. The slope of the uptake vs. time curve would be the rate of gas uptake. And the last mentioned value must be adjusted to standard pressure and temperature to be meaningful. These devices in the art are large and cumbersome.

Such a device is shown in Burlis 2,970,041 which in addition to the matters referred to above, exhibits additional characteristics that do not adapt it for the purposes desired in certain types of work. For example, the Burlis device cannot be shaken, obviously, and could not really be used for measuring changes in liquids of the sort where change in the gas dissolved in the liquid is followed, operations that are essential for most biochemical measurements. Further in such prior art systems, and it is a particular difficulty where oxygen electrodes, and carbon dioxide electrodes, are utilized, the response time is quite slow (measured in minutes). Again in prior art devices a principal difficulty in attempted recording respirometry is maintenance of a steady baseline due to long range instability in amplifier circuits. Such problems have not been solved in sensitive systems heretofore in use. These considerations point to matters that have been serious drawbacks to development heretofore of desirable instrumentation in the nature of recording differential respirometers, and other devices operating as hereinafter set forth.

Among the objects and advantages of the present invention are included method and apparatus for measurement and recording of gas volume changes in chemical processes including inorganic or organic operations well illustrated by respirometry in which even minute variations are accurately determined, measured and recorded, eliminating the objections, difficulties, and limitations of art available systems and apparatus referred to above, as well as additional problems of the art.

A principal object of the invention is to provide direct recording of gas uptake or evolution as a function of time desirably in the form of a graph whose ordinate is directly proportional to the volume of gas exchanged and whose abscissa is directly proportional to time; the mathematical slope of the line multiplied by a simple proportionality constant then yields directly the rate of gas exchange reduced to standard temperature and pressure.

Another object is to record gas exchange in a differential respirometer whose sensing device is placed between a reaction chamber and a compensation chamber so that a record of gas exchange is obtained free from error introduced by changes in ambient temperature or pressure.

Another object is to provide such a device which is stable over long periods of time, a stability achieved by using a tuned frequency circuit, for example.

Another object is to record gas exchange in a device which can be shaken to provide continuous equilibration between a liquid phase and a gas phase thereby allowing measurement of gas exchange in a liquid reaction mixture.

Another object is to record either gas uptake or gas evolution by the same device.

Another object is to provide a simple, portable, inexpensive unit which may use any source of alternating current such as 115 volt, 60 c.p.s. current, and which can fit into most currently available constant temperature baths.

Another object is to provide a device with a sensing element so sensitive that it operates essentially at thermodynamic equilibrium.

Another object is to provide a device sensitive in the micro range i.e. one that requires the removal of addition of about 0.1 microliter ($\mu$l.) of gas with a pressure change of about $10^{-5}$ mm. Hg to operate.

Another object is to provide a device in which there is maintained approximately constant pressure, approximately constant temperature when used with a proper constant temperature bath, and approximately constant gas composition, thereby facilitating interpretations of any data obtained therein.

Another object is to provide a device with a response time of less than 0.1 second.

Another object is to provide a device which is versatile enough to measure gas exchanges of from less than one $\mu$l. to more than a million $\mu$l. of gas.

Another object is to provide a device which measures total gas uptake and which is susceptible to modification so that it can incorporate an oxygen electrode or other gas specific electrodes.

Another object is to provide a device which uses the nearly perfect elastic recoil property of glass in its transducer.

Another object is to provide a sensitive pressure transducer that may be useful as an altimeter or as a pressure recorder in a space capsule or have other uses, as in the chemical industry.

Another object is to provide a sensitive differential pressure transducer by connecting one chamber to one atmosphere and the other chamber to another atmosphere and, for example, by using Bernoulli's principle, detect pressure differences due to flow, useful in measuring gases streaming from a jet airplane, in a gas or liquid flow meter, or in other applications.

Still further objects and advantages will appear from the more detailed description given below by way of illustration and explanation, and not as limiting, since various changes therein may be made by those skilled in the art without departing from the scope and spirit of the invention.

In connection with that more detailed description, the drawings show the following.

FIG. 1 is an elevational diagram of the complete instrument showing the relationship of its three subdivisions, the pressure transducer system, the injector-recorder system, and the electronic relay system;

FIG. 2 is an enlarged elevational view, principally in cross section of the compensated pressure transducer system used in the apparatus of FIG. 1;

FIGS. 2A and 2B show various positions of the stopcock seen in FIG. 1.

FIG. 3 is a schematic diagram of the electronic relay circuit.

In accordance with the present invention, gas volume changes in a chemical system operated in a closed chamber are measured by producing a change in a property of an electric circuit responsive to said gas volume variation in the operating chemical system, and automatically measuring that change in property. Desirably the operations and measurements are carried out continuously, the varying property is inductance or capacitance, and such property is converted to a corresponding voltage parameter. The amplified voltage is utilized to operate a system for injecting gas into the closed chamber to restore the gas in kind, volume and pressure to its initial value, and the amount of gas injected is automatically measured and recorded.

In general, the device may include a compensated pressure transducer coupled by an electronic relay system to an injector-recorder system. It operates on a negative feedback principle arranged so that a small decrease in gas volume (and thereby of gas pressure) causes a small change in an electrical property of the circuit, such as inductance between an induction coil and a piece of ferrite. The coil is fixed and the ferrite is attached to a membrane separating two gas filled chambers, one of which is the chamber from which the gas is being removed. In any case, the electrical parameter such as inductance or capacitance is converted to a voltage change and amplified so that it starts an electric motor. The motor drives a syringe plunger a small distance in to its barrel thereby restoring the gas volume (and pressure) to its initial value, thus restoring the ferrite to its original position thereby bringing the inductance or capacitance back to its initial value and shutting off the motor. In this way the gas that has been removed is replaced by an equal volume of gas from the syringe. The amount of gas injected is recorded by a pen attached to the plunger and writing on a drum driven at contsant speed by a second motor.

Adherence to basically sound theoretical principles, simplicity of operation and low cost of the device and method of this invention represent substantial improvement over the devices available in the art. The device here, is a null instrument which operates at substantially constant volume, substantially constant pressure, and substantially constant gas composition. Its sensitivity is noteworthy. It requires but a decrease of 1/10 $\mu$l. of gas volume to activate the system so that it remains very near to thermodynamic equilibrium during the operation of its component parts. There is used a sensing element placed between a gas consuming chamber and a chamber compensating for temperature and pressure changes which is unique in a recording respirometer. The device is useful in that it can perform all the functions ordinarily performed by Warburg and Barcroft (non-recording) respirometers, and many other functions as well.

The device may be considered a very stable and yet extremely sensititive pressure transducer. It is sensitive to less than 1/10 $\mu$l. liter change in volume. To sense this change, it has been calculated that the membrane moves only about 200 m$\mu$. Since this is at the wave length limits of visible light, the movement could be detected only with difficulty by the most high powered light microscope. This represents sensational sensitivity and when coupled with its stability and compactness, represents a substantial advnace over any existing transducer. While therefore, these devices, systems, and methods are of particular utility in the biological field, particularly in physiological and biochemical processes, they have unique value in chemical systems and technology generally where gas volume factors require exact evaluation.

Referring to the system particularly illustrated, the following general description may be given. The pressure transducer consists of two gas-tight chambers separated by a thin glass membrane to which is glued a thin strip of ferrite. Changes in ambient pressure or temperature affect both chambers equally and therefore have no influence on the position of the membrane. Since the chambers are sealed from the atmosphere, ambient pressure changes could have no effect in any case. However, changing the pressure in one chamber alone causes a corresponding bulging of the membrane toward or away from the other chamber. One chamber is constructed to receive material capable of causing a change in volume (and pressure) and is designated the reaction chamber. The other chamber contains an inductance coil with a ferrite core and the ferrite glued to the membrane but is otherwise empty and is designated the compensation chamber.

The electronic relay circuit, commanded by the transducer, consists of an oscillator (of which the transducer is a part), a tuned radio frequency transformer, a detector, a thyratron motor control and a power supply-voltage regulator circuit. When a pressure change in one of the sealed chambers causes a bulging of the glass membrane with attached ferrite, the inductance in the coil is changed. This alters the frequency of the oscillator, changing the voltage output of the tuned radio frequency transformer. The changed output is detected (changed from AC to DC) by the detector stage firing the thyratron motor control whose output triggers the injector system.

The injector consists of an electric syringe motor whose drive shaft is threaded to receive a coupling nut. As the motor turns, the nut is driven vertically upward or downward correspondingly raising or depressing the plunger of a gas-filled syringe so that gas is withdrawn or injected from the syringe barrel to the reaction chamber. The pressure in the reaction chamber is thereby restored to its initial value, the electronic balance restored, and the motor shut off. The coupling nut carries a pen which makes a trace on a paper mounted on a revolving drum driven by a second motor. In this way the amount of gas injected or withdrawn to nullify the volume (and pressure) change in the reaction chamber is recorded.

For simplicity of presentation the invention is herein described in a form designed to record the time course of oxygen uptake by a biochemical reaction mixture or a small insect. It could equally well be constructed to record the time course of gas either taken up or evolved by any organism, any chemical or biochemical reaction, a physical process, or any other event accompanied by a pressure change of at least $10^{-5}$ mm. Hg.

As shown in the drawings, gas tight reaction chamber 1 is separated from gas tight compensation chamber 2 by 0.08 mm. thick glass membrane 3. Centered on the upper surface of the membrane is securely glued thin strip of ferrite 4 which acts as part of the ferrite core of the inductor L1 mentioned below. Chamber 1 communicates freely with syringe barrel 5 and is sealed from the atmosphere where stopcock 6 is in a position $a$. With stopcock 6 in position $b$, barrel 5 communicates with the atmosphere. In position $c$ chamber 1 communicates with the atmosphere. Chamber 1 has a large opening into which reaction vessel 7 is sealed when the apparatus is in use. However, reaction vessel 7 can be removed to place in it a living preparation, a chemical reaction mixture or any other material whose volume change it is desired to measure. Chamber 2 is completely sealed off from the atmosphere when venting plug 8 is in place but communicates freely with the atmosphere when plug 8 is removed.

When the device is operating, stopcock 6 connects chamber 1 with barrel 5 (position $a$) and venting plug 8 and reaction vessel 7 are sealed in place. As gas is removed by the preparation in chamber 1, membrane 3 with attached ferrite distorts vertically downward. A pressure drop in the order of $10^{-5}$ mm. Hg in chamber 1 moves ferrite 4 sufficiently away from the ferrite core in inductor L1 to decrease its inductance. The decreased inductance increases the frequency in oscillator 9 from its neutral value of 450 kilocycles. The radio frequency stage 10 is tuned to 455 kilocycles so that it delivers maximum voltage output when the input is similarly 455 kilocycles. The frequency increase in its input from 450 towards 455 kilocycles therefore causes the voltage of the tuned frequency stage to increase. The increased voltage output of the tuned transformer is detected (changed from AC to DC) by the detector stage 11 and led to the control grid of the thyratron motor control stage 12. The increased voltage causes the thyratron tube to conduct thereby completing the circuit to the motor 13 and indicator light 14 of the injector system. The signal is led from inductor L1 and capacitor C1 in the transducer system to the remainder of oscillator 9 in relay box 15 by wires 16.

The drive shaft of syringe motor 13 is connected by syringe couple 17 to syringe lead screw 18 so that screw 18 turns when the motor is running. Coupling nut 19 is thereby driven down screw 18 carrying pen holder 20 with pen 21 with it. Pen 21 traces a line on paper 22 attached to drum 23. Drum 23 is driven at a slow continuous speed by timing motor 24 whose drive shaft 25 is attached by timer couple 26 to the axial shaft 23' of drum 23. Pen 21 traces a line whose vertical coordinate is proportional to the volume of gas removed from chamber 1 and whose horizontal coordinate is proportional to time. Nut 19 is also attached by clamp 27 to syringe plunger 28 which is thereby pressed into syringe barrel 5 displacing gas from barrel 5 to chamber 1 thereby pressing membrane 3 with attached ferrite 4 to its neutral position. The higher inductance of inductor L1 is restored. The frequency of oscillator 9 is reduced to 5 kilocycles below that of tuned transformer 10 whose voltage output therefore drops. The thyratron ceases to fire and the circuit is opened shutting off motor 13 and indicator light 14. In this way the fraction of a microliter of gas removed from the reaction chamber by the preparation is replaced by a device which simultaneously and instantaneously makes a record of the time course of the gas replacement.

As shown in FIGS. 2 and 3 the 450 kilocycle signal in the oscillator is generated by a system of which both inductor L1 and capacitor C1 are components. An alternate form of the invention is to exchange the two components placing capacitor C1 in the compensation chamber. In this case the ferrite 4 is replaced by a thin coating of aluminum or other conductor on the glass membrane 3 and the wire from the inductor L1 led to the coating on the membrane. The circuit would remain otherwise the same with minor changes in the values of some of the components. Such an alternate arrangement may be more sensitive but is less stable since the capacitor C1 is sensitive to the humidity changes to which it would be subjected in the compensation chamber whereas the inductor L1 is humidity insensitive.

The parts in the electronic relay circuit set forth in FIG. 3 are:

L1—490 microhenry inductance with ferrite core. Inductor L1 and capacitor C1 form a tank circuit which together with membrane 3 and attached ferrite 4 comprise the transducer. Inductance L1 is located in the capsule and is adjacent to the moveable diaphragm 3 to which is attached a portion of the ferrite core 4. Movement of the diaphragm therefore causes an inductive change. Components L1, C1 and C3 form a resonant tank circuit whose frequency of oscillation is 450 kilocycles.

L2—25 millihenry inductance. L2 is a radio frequency choke which prevents the radio frequency energy from returning to ground. At the same time it permits the passage of direct current to the cathode from ground.

L3—Primary of tuned radio frequency transformer. Components L3 and C6 form a parallel tuned resonant tank circuit. Its frequency of resonance is 455 kilocycles.

L4—Secondary of tuned radio frequency transformer. Components L4 and C7 form a parallel tuned resonant tank circuit. Its frequency of resonance is 455 kilocycles. The secondary of this transformer is inductively coupled to the primary. The transfer of radio frequency energy through this transformer is maximum only at 455 kilocycles.

C1—250 picofarad capacitor. C1 and L1 form the series resonant of the oscillator. The frequency of oscillation is primarily determined by the values of C1 and L1.

C2—2000 picofarad capacitor, part of a voltage divider. Components C2 and C3 form a voltage divider.

The tank circuit L1 and C1 whose losses must be overcome in order to perpetuate oscillation receive this energy from the cathode of tube 6AH6 by the connecting line from the cathode to the junction of C2 and C3.

C3—2000 picofarad capacitor, part of a voltage divider. C3 and C2 form the voltage divider just described.

The portion of voltage appearing across C3 is applied to the control grid of tube 6AH6. By the amplifying action of the tube 6AH6, energy is returned to the tank circuit via the cathode in an amount sufficient to overcome circuit losses.

C4—1000 picofarad capacitor. Components C4 and R1 form a grid leak bias voltage network. This voltage appears between the grid and cathode of tube 6AH6 and is a result of the rectifying action of the grid and cathode. This bias is essential in establishing the correct amount of tube current for normal and proper grid control of this tube.

C5—1000 picofarad capacitor. Screen grid bypass capacitor. This capacitor provides a low AC resistance path to ground for the 450 kilocycle voltage thereby establishing the screen grid of tube 6AH6 at AC ground while the primary power for the stage which is DC is applied to the tube. It is necessary to bypass this screen, which is operating as the anode of the oscillator, to ground to insure the appearance of as much of the radio frequency energy as possible across the RF choke L2 which supplies the tank circuit with energy.

C6—Components C6 and L3 form a parallel tuned resonant tank circuit. Its frequency of resonance is 455 kilocycles. It is the primary of the radio frequency transformer 10.

C7—Components C7 and L4 similarly form a parallel tuned resonant tank circuit. Its frequency of resonance is also 455 kilocycles. It is the secondary of the radio frequency transformer 10.

C8—1000 picofarad capacitor. It charges to the peak value of the AC input signal on negative alternations. During the positive alternations this voltage, across this condenser is applied in series through D2 to the output.

C9—0.01 microfarad capacitor. This capacitor filters out the pulsating DC delivered by the detector stage.

C10—2 microfarad capacitor. This capacitor is in series with the syringe motor and charges to opposite polarity through the diode (D3) and thyratron 2D21 an alternate alternations of the sixty cycle input to the motor.

C11—50 microfarad capacitor. Filter condenser used to smooth out the pulsating DC from the rectifier diode D4.

C12—0.01 microfarad capacitor. Chassis bypass capacitor. This establishes the chassis and circuitry at the same RF voltage.

R1—100,000 ohm resistor. This is the gridleak bias resistor. This resistor with C4 forms the bias determining elements for the proper operation of the oscillator tube 6AH6.

R2—100,000 ohm resistor. Screen dropping resistor. This drops the voltage to the screen of 6AH6 to decrease the amplitude of oscillations. Excessive power in the oscillator circuit would cause heating of the circuit components and a consequential undesired frequency shift.

R3—10 megohm resistor. Load resistor for detector. This is made as high as practicable in order to achieve maximum sharpness of resonance ("Q").

R4—10 megohm resistor. This resistor couples the output voltage from the detector to the thyratron. It is made large in order to minimize the loading effect the thyratron has when firing.

R5—22 ohm resistor. Limiting resistor to prevent damage to D4. When C11 is discharge it presents practically zero reactance to 120 volts and R5 limits the current to a safe value.

R6—2,600 ohm resistor. Limiting resistor to gas tube OB2. The voltage drop across this resistor allows tube OB2 to operate at its characteristic 108 volts.

R7—100,000 ohm current limiting resistor for lamp 14.

6AH6—Oscillator and tuned radio frequency amplifier tube.

6AL5—Duo-diode tube. Used as a peak to peak detector.

2D21—Thyratron tube. Used as the motor control tube.

OB2—108 volt gas filled voltage regulator tube.

D1—½ 6AL5 detector diode tube.

D2—½ 6AL5 detector diode tube.

D3—1N645 silicon diode syringe motor control diode.

D4—1N645 silicon diode power supply rectifier.

14—Neon indicator lamp NE2.

29—Transformer with secondary at 6.3 volts to heat filaments of vacuum tubes.

OSCILLATOR—TRANSDUCER

The oscillator is a series tuned Colpitts oscillator, also called the Clapp oscillator. This circuit has two outstanding features which make it particularly suitable for the invention.

(1) Excellent frequency stability. A severe cause of frequency drift in oscillators can be attributed to changing interelectrode capacities within the vacuum tube. In most LC (Inductance capacity) oscillator circuits the LC tank circuit is in parallel with these interelectrode capacities. Consequently as they change, the frequency changes. By using a series resonant circuit the output impedance is low at resonance. This low impedance shunted across the interelectrode capacities is proportionally affected very little by the changing interelectrode capacities.

(2) The tank circuit because of its low impedance may be operated several feet from the rest of the oscillator circuitry with no adverse effects. Remote operation is necessary since the transducer is in the compensation chamber.

OPERATION

This oscillator is of the series resonant LC tank circuit type. The resonant tank circuit is comprised of L1 and C1. The tank circuit is similar in effect to a mechanical flywheel. Once a flywheel has been set spinning it will continue until friction causes it to stop. The electrical behavior of an LC tank circuit is similar. Once it has been energized it will continue to oscillate until circuit losses cause it to stop.

The oscillator tube provides the means whereby the tank circuit receives an electrical push at each cycle in order to overcome these losses. This is accomplished by driving the input grid of tube 6AH6 from the output of the tank circuit. This signal is amplified by tube 6AH6 and then returned to the tank circuit. The voltage across C3 drives the tube and the voltage across L2 energizes the tank. The frequency of oscillation is dependent upon the tank circuit values of L1 and C1.

The screen grid of tube 6AH6 is used as the plate of this oscillator circuit. Resistor R2 reduces the voltage to the oscillator circuit. This minimizes heating of the circuit elements which would cause a frequency change.

The output of the oscillator is taken from the plate of tube 6AH6. The voltage here is amplified and applied to the tuned radio frequency transformer 10.

The DC plate supply voltage is 108 volts regulated by voltage regulator 30. This aids in maintaining the frequency constant.

TUNED TRANSFORMER—DETECTOR

Operation

The output from the oscillator 9 appears at the secondary of the tuned radio frequency transformer 10. It is desirable at this point to convert the 450 kilocycle signal into DC. The DC is necessary for the operation of the thyratron motor control stage 12. This detector 11 which is a peak to peak detector converts this radio frequency voltage to a DC voltage. This DC voltage is directly proportional to the radio frequency voltage appearing at the secondary of the transformer and is equal to 2.828 times the RMS (root-mean-square) voltage. Therefore any slight change in amplitude as would be caused by a change in frequency of the oscillator due to a change in L1 resulting from a change in pressure within the capsule, will result in an amplitude change multiplied by the factor 2.828.

The circuit operates in the following manner. Assume at a given one half cycle that the top of L4 is negative and the bottom or ground side is positive. Current will flow into C8 through D1. Thus C8 will become charged to the peak value of the applied AC sine wave. On the next alternation, when the top of L4 is positive and the bottom is negative, capacitor C8 which is still charged will be in series with the voltage appearing at the secondary of the transformer. The polarity is now correct for conduction to take place through diode D2. Current now flows from ground through R3 through diode D2 and into the capacitor C8. This places the full peak to peak voltage across R3 which is the output from the detector. C9 serves as a filter to maintain this voltage at a steady DC value rather than changing at the RF rate.

THYRATRON MOTOR CONTROL STAGE

The last stage is used to turn the motor on or off. It makes use of a gas filled tetrode thyratron 2D21. It is characteristic of this tube to conduct heavily once the tube has fired or ionized. The grid loses all control once the tube has fired. Thus the tube acts much like a switch. It is either all the way on or all the way off. In order to deionize the tube it is necessary to interrupt the anode current. This is accomplished by applying AC to the anode. Therefore on every negative alternation the anode supply is interrupted and grid control is restored.

This tube, like all electron tubes, conducts only when the plate is positive with respect to the cathode. Because both positive and negative alternations are required for the motor a special circuit was devised. A diode with condenser is employed to devise a rather unique and original circuit. Its operation is as follows:

Assume the grid voltage is negative and the tube is not conducting. Capacitor C10 will charge to the peak value of the AC voltage by conducting through diode D3 and the motor on negative alternations. The motor side of the capacitor will be charged negatively. The capacitor will acquire this charge during the first few cycles of AC and then no more current will flow through the motor. This is under the conditions when the motor is not running. Now assume the grid goes in a positive direction and ionization takes place. This will occur on the positive alternation of the AC only. On the negative alternation current will flow through the motor and diode into the condenser. On the positive alternations it flows to the motor through the thyratron and condenser. Therefore current to the motor flows on both alternations of the AC sine wave. Yet only one thyratron tube is used for complete control of both alternations to the motor.

EXAMPLE

During cellular respiration oxygen gas is consumed and carbon dioxide gas is evolved. If the carbon dioxide gas is removed so that it does not affect the volume or pressure in a closed zone, the uptake of oxygen will be the only source of variation of volume and pressure in the closed zone so that the volume and pressure decrease can be used to measure oxygen uptake.

To measure and record the momentary gas uptake, the preparation is placed in reaction vessel 7. If, for example, oxygen uptake is to be measured, a small filter paper 31 moistened with alkali is positioned at the top of vessel 7. The large surface of moist alkali reacts almost immediately with evolved carbon dioxide gas converting it into non gaseous bicarbonate so that it has no effect on the gas pressure in chamber 1.

With venting plug 8 removed and stopcock 6 in position $c$, the pressure in both reaction chamber 1 and compensation chamber 2 is atmospheric, say 780 mm. Hg. Venting plug 8 is inserted, thereby slightly increasing the pressure in compensation chamber 2. This slight pressure increase pushes membrane 3 toward the reaction chamber and activates syringe motor 13 and indicator light 14. Stopcock 6 is turned to position $a$ and the plunger depressed by hand until sufficient gas is injected into chamber 1 to bring its pressure up to that in chamber 2, thereby pushing membrane 3 back to its former position and turning off the indicator light and motor. (The slight pressure increase in the chambers is inconsequential and is ignored in the sample calculation below.) Now stopcock 6 is turned to position $b$ to seal off chamber 1 and open barrel 5 to the atmosphere. Coupling nut 19 is loosened by pressure screw 32 and slid to the top of syringe drive screw 18. Pen 21 is filled with ink and allowed to rest in its spring-loaded position on paper 22. Syringe plunger 28 is slowly elevated drawing gas in through stopcock 6 until plunger 28 fits securely into clamp 27. Stopcock 6 is now returned to position $a$ so that barrel 5 again communicates with chamber 1. Nut 19 is again loosened and pressed slightly downward until the turning on of motor 13 and light 14 signal that the membrane is again at its operating position. The apparatus is lowered into a constant temperature bath at, say 25° C. until the water level is at the top of the gas space in barrel 5. The apparatus is held by receptacle 33.

As gas is removed by the preparation from chamber 1, the pressure falls about $10^{-5}$ mm. Hg due to the removal of about 0.1 $\mu$l. of gas. The membrane moves about 200 m$\mu$. This is sufficient to activate the injector system and restore conditions to their former state. The trace on the paper is therefore a series of steps but they are so small as to be imperceptible and the trace appears on the paper as a continuous line.

When the preparation has consumed sufficient gas to bring nut 19 to the bottom of screw 18, and plunger 28 to the bottom of barrel 5, valve 6 is turned to position $b$, nut 19 is loosened and plunger 28 together with nut 19 is brought back by hand to its uppermost position. Stopcock 6 is then returned to position $a$ and the measurement continued.

At the end of the test, the rate of gas uptake ($QO_2$) may be simply calculated from the trace on the paper by multiplying the mathematical slope $(y'-y)/(x'-x)$ of the line on the graph paper by a proportionality constant $k_g$ which:

(a) converts vertical ($y$) units on the graph paper to volume units, for example, microliter ($\mu$l.), (b) converts horizontal ($x$) units on the graph paper to time units, for example hours, (c) reduces the gas volume to standard temperature (273° C.) and pressure (760 mm. Hg), and (d) expresses the gas uptake rate in terms of a parameter describing the amount of reacting material, for example, grams live weight, according to the following equation:

$$(1) \quad Q_{gas} = \frac{(y'-y)}{(x'-x)} k_{gas}$$

Where $Q_{gas}$ = the rate of gas uptake in $\mu$l.$_{gas}$/gram/hour $y'-y$ = the vertical distance in $y$ units traveled by the syringe plunger (and pen)

$x'-x$ = horizontal distance in $x$ units traveled by the revolving drum relative to the pen $$(2) \quad k_{gas} = \frac{k_y \times 273 \times p}{k_x \times (273+t) \times 760 \times w}$$

$k_y$ = volume in $\mu$l. between calibration marks on syringe distance in $y$ units on graph paper between calibration marks on syringe $k_x$ = time in hours between calibration marks on drum distance in $x$ units on graph paper between calibration marks on drum $w$ = weight in grams of the preparation $t$ = bath temperature in degrees centigrade $p$ = atmospheric pressure in millimeters of mercury at the moment the reaction chamber was sealed off A sample calculation is illustrated with reference to a typical trace on the graph paper presented below.

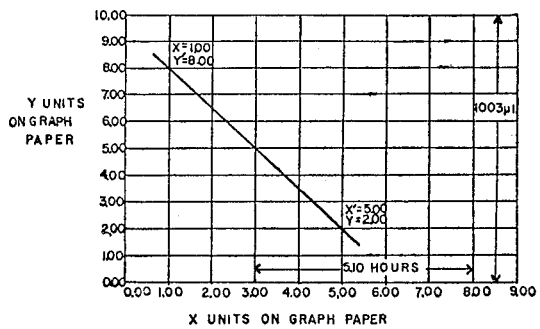

From the graph
$y'-y = 8.00 - 2.00 = 6.00$ $y$ units
$x'-x = 5.00 - 1.00 = 4.00$ $x$ units
From the syringe calibration described below $$k_y = \frac{1003 \ \mu l.}{10.0 \ y \text{ units}} = 100.3 \ \mu l./y \text{ unit}$$

From the drum calibration described below $$k_x = \frac{5.10 \text{ hours}}{5.00 \ x \text{ units}} = 1.02 \text{ hours } x \text{ unit}$$

From the bath thermometer
$t = 25.0°$ C.
From reading the barometer at the moment the system is sealed off
$p = 780$ mm. Hg.
From weighing the preparation
$w = 5.93$ grams dry weight
Substituting in Equation 2

$$k_{gas} = \frac{100.3 \ \mu l./y \text{ unit} \times 273°C. \times 780 \text{ mm. Hg}}{1.02 \text{ hours}/x \text{ unit} \times 298°C.}$$
$$\times 760 \text{ mm. Hg} \times 5.93 \text{ grams}$$

$$= 15.59 \frac{\mu l./y \text{ unit}}{\text{hours}/x \text{ unit} \times \text{grams}}$$

$$Q_{gas} = \frac{6 \ y \text{ units}}{4 \ x \text{ units}} \frac{15.59 \ \mu l./y \text{ unit}}{\text{hours}/x \text{ unit} \times \text{grams}}$$

$$= 23.4 \ \mu l./\text{hour}/\text{gram}$$

The calibration of the syringe and drum is easy for one skilled in the art. A simple calibration of the syringe in $y$ units is possible with the syringe and paper in place on the apparatus. A calibration mark is made near the top and at the bottom of the syringe barrel. With valve 6 in position $b$ the plunger-coupling nut assembly is raised to the upper calibration mark and the drum revolved a short distance by hand using the knurled knob 34. The plunger-coupling nut assembly is then depressed to the lower calibration mark and a second trace is made on the paper. The volume contained in the syringe between the calibration marks (1003 $\mu$l. in the illustration) divided by the distance on the graph paper between the traces corresponding to these same two marks (10.0 $y$ unit in the illustration) is the constant $k_y$. For precise work the volume contained between the calibration marks on the syringe can be precisely determined by weighing the amount of water or mercury contained therein and dividing by the specific gravity of the water or mercury.

The calibration of the drum speed in hours is performed by measuring the time required for the drum to revolve between any two vertical lines on the drum.

The constant $k_{gas}$ is always the same for a given syringe used on the same apparatus with a given drum revolution speed maintained at the same temperature. Since $k_{gas}$ contains only multiplying terms it is easy to alter this constant for changed atmospheric pressure at the time of sealing the reaction chamber off or for different weights of material.

This description as just given explains the system and apparatus wherein varying gas volume is measured in terms of inductance. In this form no wires need pass to the membrane. For some purposes it may be desired to change the transducer to a capacitor. For the capacitor membrane 3 is coated with a conducting metal and moved toward or away from a second fixed capacitor plate.

A unique feature of the respirometer is its long term stability. This is due primarily to the unvarying nature of the frequency of the oscillator and radio frequency stages. The stability of the series tuned Colpitts oscillator is discussed in column 18. It should further be recalled that its critical frequency defining elements L1 and C1 are immersed in the constant temperature bath and are freed from temperature induced variation. The membrane, which holds the ferrite apart of the inductor, is glass with excellent elastic recoil properties and of course the entire operation of sensing the gas removal and replacing the gas applies a negative feedback principle.

In the device of this invention, to realize advantages of this invention it may be noted that the movable part of the transducer is on the membrane which separates the animal chamber from the compensating chamber. This means that any change in atmospheric pressure or environmental temperature affects both sides of the membrane equally with no net displacement of the membrane. However, the device of this invention is completely closed off from the atmosphere on both sides of the transducer so that changes in atmospheric pressure will not affect it in any event.

Referring to the inductor system, the ferrite moves in relation to the coil by a distance of the order of less than 200 m$\mu$ for a response. With respect to sensitivity it is estimated to be of the order of $\frac{1}{10}$ $\mu$l., which would be 1000 times more sensitive than recording systems available on the market.

The record drawn by the system has an ordinate proportional to the volume of gas taken up and an abscissa proportional to time. The mathematical slope of the uptake time line multiplied by a simple proportionality constant is the rate of oxygen uptake. This important parameter, often signified by $QO_2$, is therefore much easier to calculate than in any other existing method. The device of the invention measures about 2 inches wide by 12 inches long and 18 inches tall, illustrating compactness and adaptability. It may be attached to a support designed to fit conventional "Warburg" baths available in most biochemical and biological laboratories. It operates from conventional 115 volt, 60 cycle line current. It may be set into operation in a few minutes by an unskilled technician.

The device is conceived, designed, and constructed so that it may be shaken vigorously without disturbing the sensitive transducer. In this way the gase phase may be continuously equalibrated with a liquid phase, a necessary condition for measurements of gaseous exchange in fluids and particularly important for most biochemical measurements.

Since the syringe motor may be induced to turn in either direction depending whether the pressure increases or decreases in the reaction chamber the device may be used to measure both gas uptake and gas evolution.

Perhaps the principal difficulty in attempted sensitive recording respirometers in the art is the maintenance of a steady baseline, due to long range instability in amplifier circuits. These problems are avoided in the present invention by using an electronic relay. The relay in the device is designed for stability, compactness and lightness.

A difficulty with such devices as oxygen electrodes, carbon dioxide electrodes, is a slow response time (measured in minutes). The present device has a response time of less than one second.

Since the device measures total gas uptake it could be used in conjunction with an oxygen electrode-recorder system to measure rapid changes in carbon dioxide in the presence of oxygen.

Because of its long term stability, the device will enable day-, week-, or even month-long measurements of gas exchange in organisms, tissue cultures or other materials thereby opening areas of research hitherto unapproachable.

Having thus set forth our invention, we claim:

1. The method of continuously measuring gas volume content change in a first closed reaction zone of a chemical system in which the rate of change of gas volume is subject to variation, said chemical system including two gas-tight chambers constituted by said closed reaction zone and a compensating zone separated from the reaction zone by a thin glass membrane to which a thin strip of ferrite is attached; said method including the steps of producing a change in electrical inductance in an electrical system responsive to change in gas volume and pressure in said reaction zone, said electrical system having fixed capacitance; converting the change in electrical inductance to a corresponding change in electrical voltage, said change in voltage operating a system for modifying by injecting gas into or withdrawing gas from said reaction zone to restore gas volume and pressure therein to its original value; and measuring the amount of said injected or withdrawn gas.

2. The method of claim 1 in which the measurement of the amount of gas injected or withdrawn responsive to a change in volume in the reaction zone is carried out automatically.

3. A device for continuously measuring gas volume change particularly in chemical, physiological and biochemical activities which comprises a first closed reaction chamber for conducting a chemical process involving gas volume change in a varying rate, a second closed compensating chamber separated from said first closed reaction chamber by a glass membrane having substantial elastic recoil properties and with a strip of ferrite attached thereto, said glass membrane and strip of ferrite comprising an electrical sensing device including a fixed capacitance and inductor responsive to gas volume change in said first closed chamber, a device for converting varying electrical inductance into varying electrical voltage, a system responsive to said varying electrical voltage for modifying gas content in said first closed chamber to restore the volume and pressure of the gas therein to its initial value, and a device for measuring the amount of gas change.

4. A device as set forth in claim 3 in which said membrane has a coating of conductive metal.

5. In a respirometer, a closed reaction chamber, a closed compensation chamber immediately adjacent to said reaction chamber, a glass membrane having substantial elastic recoil properties separating said reaction and compensating chambers, and a ferrite component mounted on said glass membrane.

6. In a respirometer as set forth in claim 5, a membrane in the form of a strip having a thickness of about 0.08 mm., said ferrite component being mounted upon the side of said strip remote from said reaction chamber.

7. A respirometer as set forth in claim 5 where said membrane has a coating of conductive metal.

References Cited

UNITED STATES PATENTS

| | | | |
|---|---|---|---|
| 2,970,041 | 3/1960 | Burlis et al. | 23—256 |
| 3,006,336 | 7/1957 | Burlis et al. | 128—2.08 |
| 3,066,535 | 5/1957 | Opstelten et al. | 73—398 |
| 3,127,571 | 3/1964 | Crowcroft | 73—398 |
| 3,323,872 | 6/1967 | Scott | 23—256 X |

JOSEPH SCOVRONEK, Primary Examiner

U.S. Cl. X.R.

23—255, 256; 73—398; 128—2.08; 161—196; 317—246; 324—59, 61, 71; 336—30